United States Patent [19]
Crall et al.

[11] 3,978,833
[45] Sept. 7, 1976

[54] ENGINE CONTROL CIRCUIT FOR PROVIDING A PROGRAMMED CONTROL FUNCTION

[75] Inventors: Frederick William Crall, Farmington; LaVerne Andrew Caron, Sterling Heights, both of Mich.

[73] Assignee: Chrysler Corporation, Highland Park, Mich.

[22] Filed: June 13, 1975

[21] Appl. No.: 586,790

[52] U.S. Cl. ........................ 123/117 R; 123/32 EA; 123/102
[51] Int. Cl.² ........................ F02P 5/04; F02B 3/00
[58] Field of Search ...................... 290/40; 60/39.28; 123/117 R, 117 P, 32 RA, 139 E, 162

[56] References Cited
UNITED STATES PATENTS

| | | | |
|---|---|---|---|
| 3,908,616 | 9/1975 | Sasayama | 123/117 R |
| 3,923,021 | 12/1975 | Stark | 123/117 R |

*Primary Examiner*—Charles J. Myhre
*Assistant Examiner*—Ronald B. Cox
*Attorney, Agent, or Firm*—Talburtt & Baldwin

[57] ABSTRACT

A control system for an internal combustion engine contains a novel programmed control function circuit which contains: an accumulation function circuit for developing an accumulation function representative of the duration for which the engine has been operating in selected operating modes; a transducer circuit which develops a signal representative of the instantaneous value of a selected engine operating parameter; and a modulation circuit which modulates the two to develop a programmed output signal which is utilized in controlling the engine. In the preferred embodiment, the accumulation function is representative of the duration for which the engine has been operating at idle and non-idle conditions and the selected operating parameter is engine manifold vacuum; the modulation circuit develops from these, a programmed vacuum advance signal utilized in controlling the spark timing advance for the ignition system of the engine.

18 Claims, 8 Drawing Figures

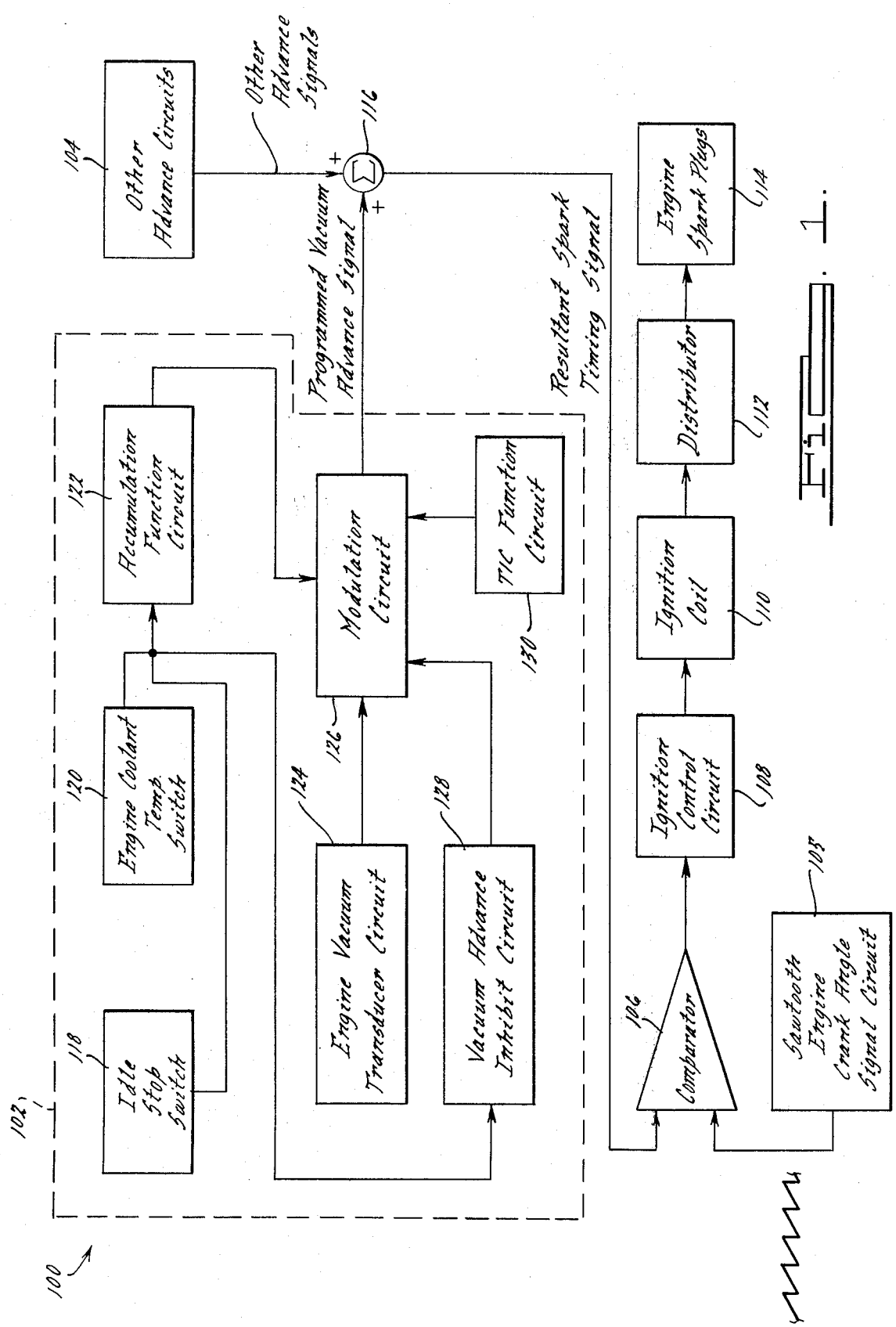

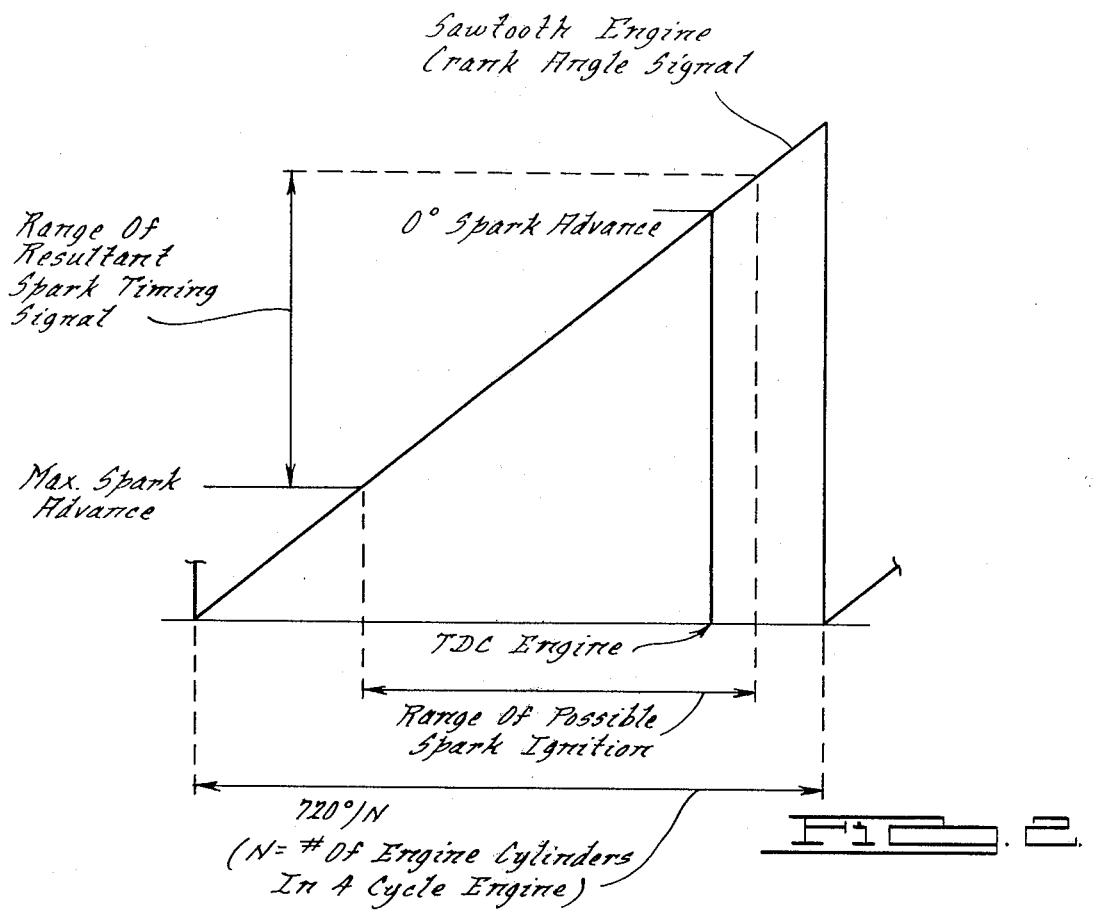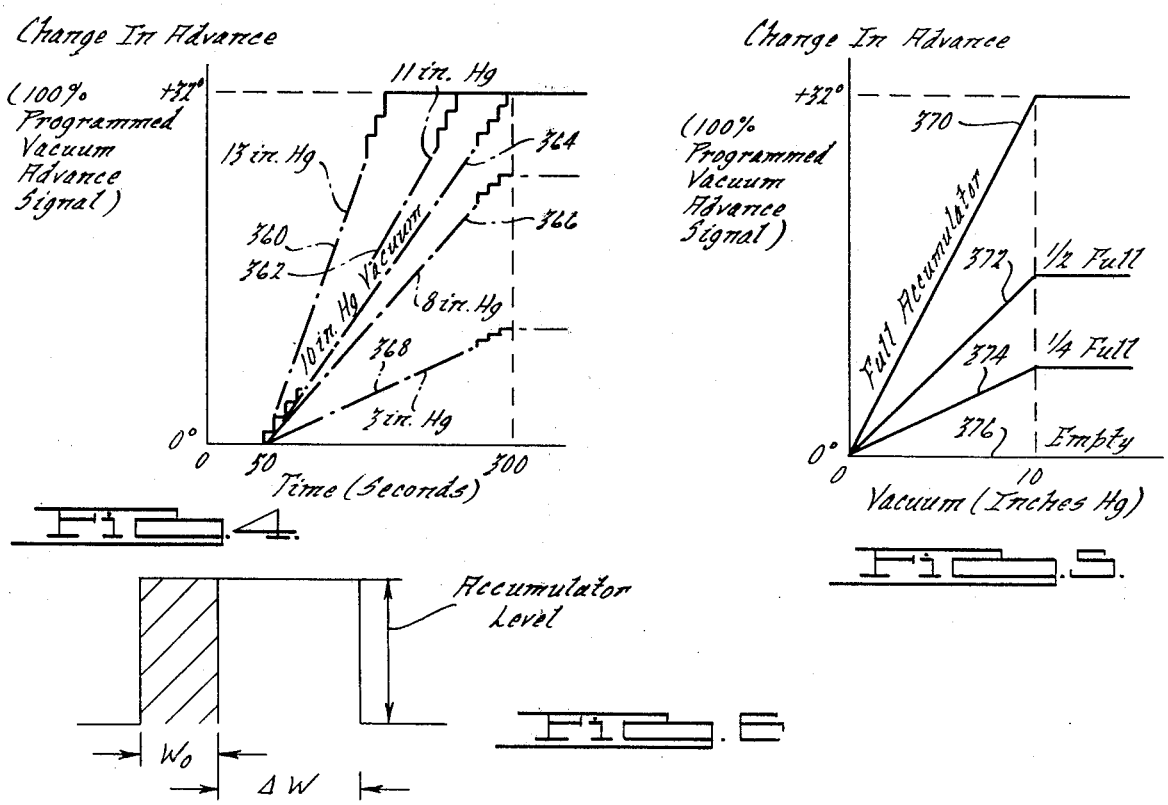

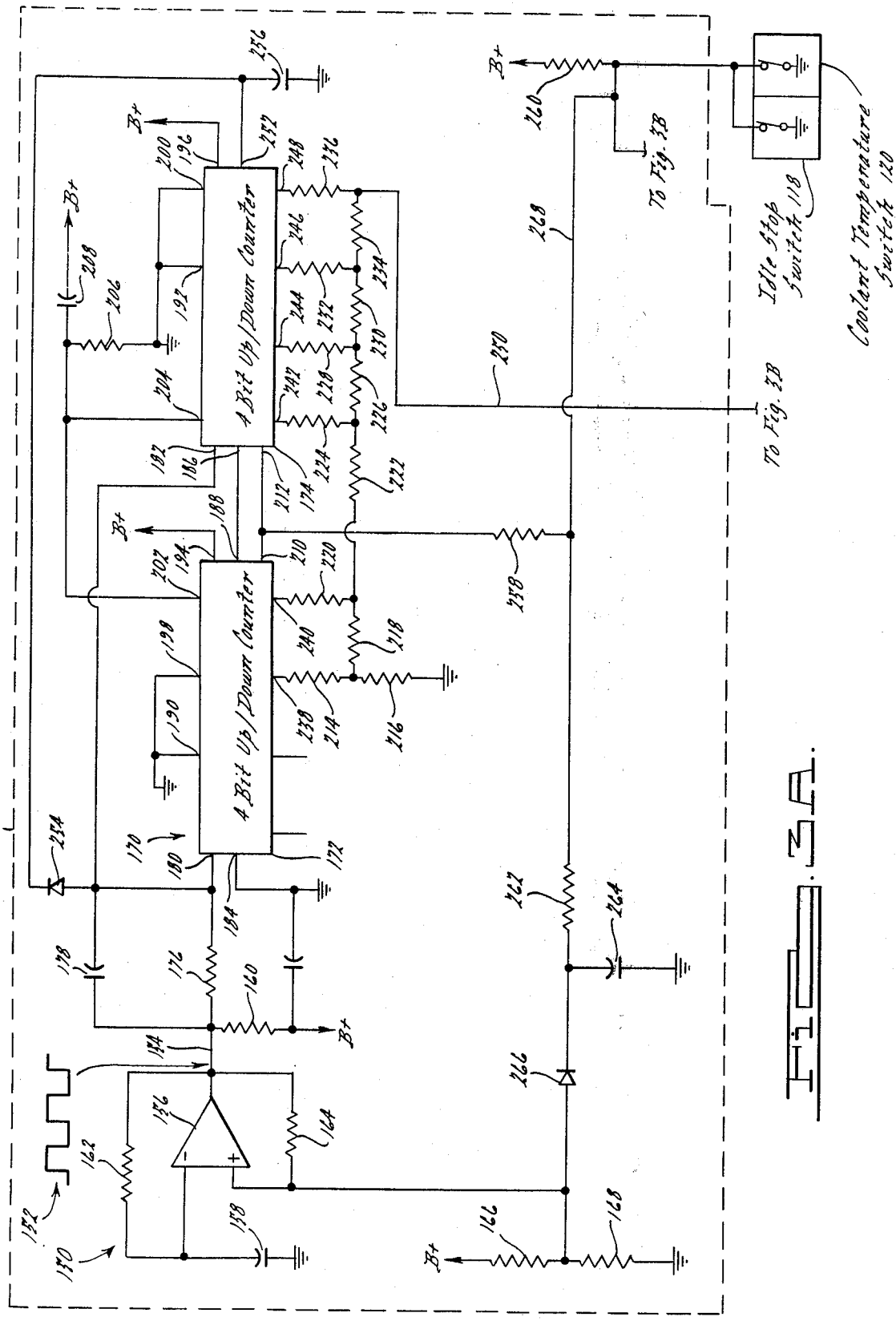

FIG. 2B.

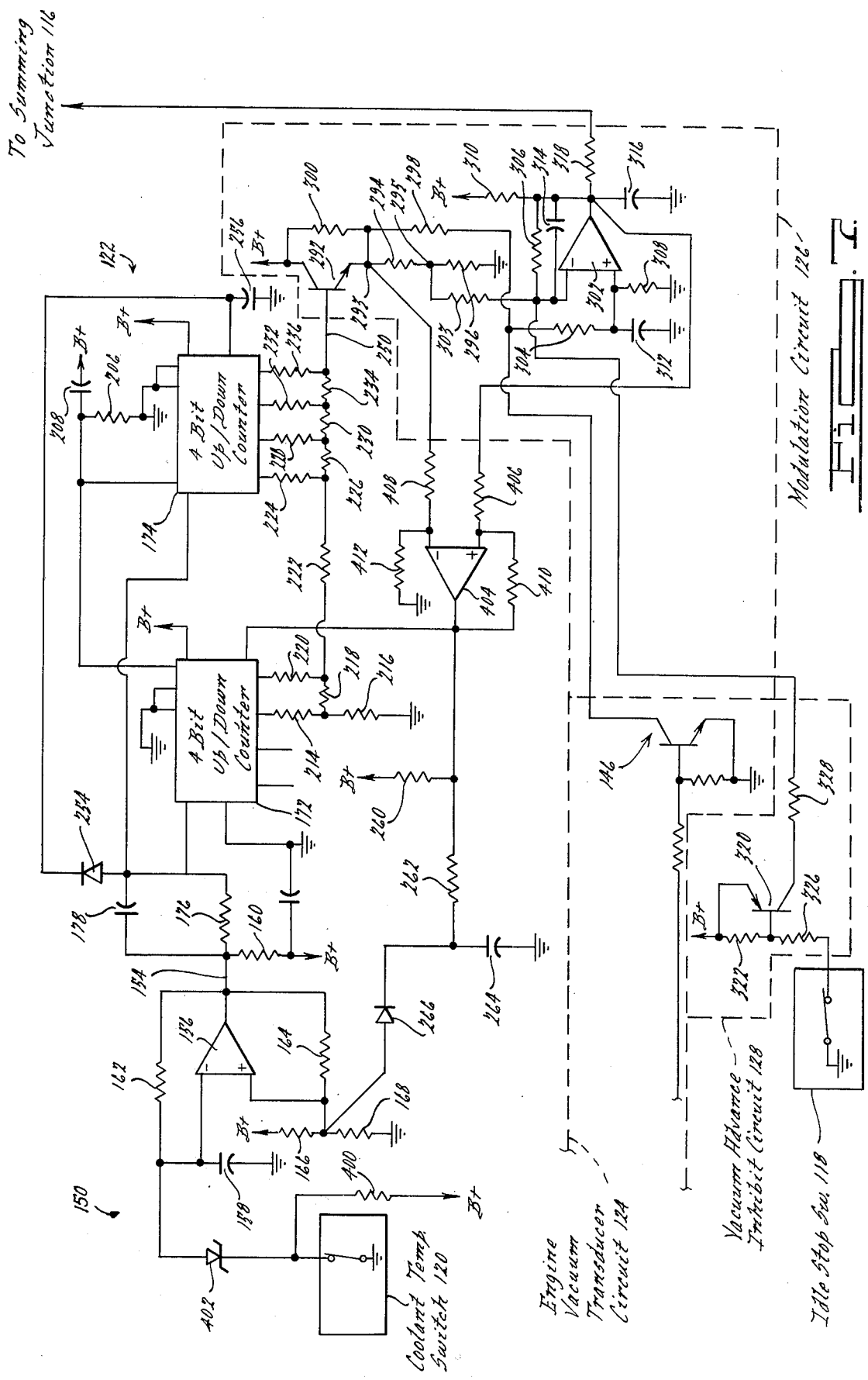

3,978,833

ENGINE CONTROL CIRCUIT FOR PROVIDING A PROGRAMMED CONTROL FUNCTION

BACKGROUND AND SUMMARY OF THE INVENTION

This invention pertains to engine controls and more particularly a novel electronic circuit for such a system. In the preferred embodiment the invention pertains to an improvement in an engine spark timing control system. The copending U.S. application Ser. No. 570,671 discloses and claims a novel engine control system, one novel feature of which relates to the development of a programmed vacuum advance signal for controlling engine spark timing.

The present invention is directed toward a novel engine electronic control circuit which may be used, inter alia, for developing a programmed vacuum advance signal. With the present invention there is provided a reliable, versatile, efficient and economical circuit arrangement which: develops a signal representative of the instantaneous value of an engine operating parameter (for example, engine manifold vacuum); develops an accumulation function representative of engine operation in selected operating modes (for example, in engine idle and non-idle conditions); and modulates the accumulation function and the operating parameter signal together to develop a programmed output signal (for example, a programmed vacuum advance signal).

Further features and advantages of the invention will be seen as the description proceeds.

BRIEF DESCRIPTION OF THE DRAWINGS

The accompanying drawings illustrate preferred embodiments of the present invention according to the best mode presently contemplated in carrying out the invention.

FIG. 1 is a schematic diagram in block diagram form illustrating the present invention as applied to an engine spark timing control system.

FIG. 2 is a graph plot useful in explaining the operation of the system depicted in FIG. 1.

FIGS. 3A and 3B are electronic schematic diagrams which should be considered together and represent a first embodiment of the present invention.

FIGS. 4, 5 and 6 are graph plots useful in explaining the operation of the circuit schematic shown in FIGS. 3A and 3B. FIG. 7 is an electronic schematic diagram illustrating a second embodiment of the present invention.

CROSS REFERENCE TO RELATED APPLICATIONS

Gordon W. Fenn, "Engine Control System", Ser. No. 570,671 filed Apr. 25, 1975; LaVerne A. Caron, Lawrence W. Tomczak, and Frederick W. Crall, "Transducer Circuits" Ser. No. 559,203, filed Mar. 17, 1975; Frederick W. Crall, Lawrence W. Tomczak, and LaVerne A. Caron, "Circuit for Generating a Sawtooth Engine Crank Angle Signal and An Analog Engine Speed Signal" Ser. No. 545,274 filed Jan. 30, 1975; all of which are assigned to the same assignee as the present application.

DESCRIPTION OF THE PREFERRED EMBODIMENTS

Figure 2B:
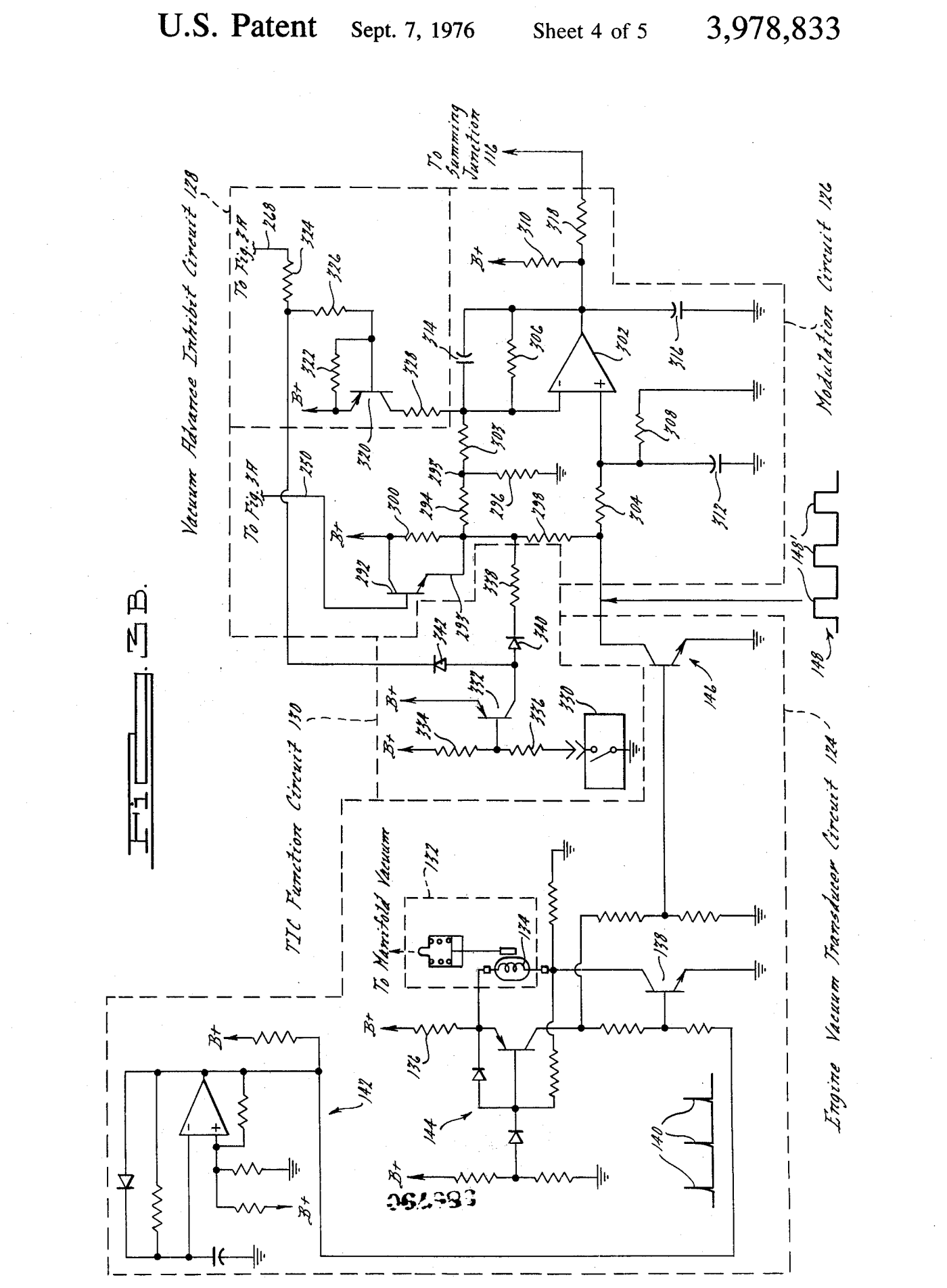

FIG. 1 illustrates an exemplary use of the present invention in an engine spark timing control system 100. System 100 comprises: a programmed vacuum advance circuit 102; one or more other advance circuits represented by the single reference numeral 104; a sawtooth engine crank angle signal circuit 105; a comparator 106; an ignition control circuit 108; an ignition coil 110; a distributor 112; and spark plugs 114. Comparator 106, ignition control circuit 108, ignition coil 110, distributor 112, and spark plugs 114 are known, conventional ignition system components and details thereof are omitted for the present disclosure for sake of clarity and brevity. The sawtooth engine crank angle signal circuit 105, details of which may be obtained from co-pending U.S. application Ser. No. 545,274 and whose disclosure is incorporated in the present application by reference, develops a sawtooth signal which is applied to one input of comparator 106. The other input of comparator 106 receives a resultant spark timing signal from a summing junction 116 at which a programmed vacuum advance signal from circuit 102 and any other advance timing signals from the other advance circuits 104 are algebrically summed together. The resultant spark timing signal is compared against the sawtooth crank angle signal and when a predetermined relationship between the two is attained (specifically when the two are equal) an ignition spark at the appropriate spark plug is generated. By controlling the value of the resultant spark timing signal, the engine crank angle at which the signal intersects the sawtooth crank angle signal is controlled to thereby control the spark timing in relation to engine top dead center (TDC) position. FIG. 2 illustrates graphically this manner of operation.

The novel arrangement of the present invention relates to the means by which the programmed vacuum advance signal is developed. The programmed vacuum advance circuit 102 contains an idle stop switch 118; an engine coolant temperature switch 120; an accumulation function circuit 122; an engine vacuum transducer circuit 124, a modulation circuit 126; a vacuum advance inhibit circuit 128 and a TIC function circuit 130. Briefly once the engine coolant temperature has reached a certain minimum level indicating that the engine has warmed up, accumulation function circuit 122 supplies to modulation circuit 126, an accumulation function which is representative of the duration for which the engine has been operating in idle and non-idle modes. The engine vacuum transducer circuit 124 supplies to modulation circuit 126, a signal representative of the instantaneous value of engine manifold vacuum. Modulation circuit 126 modulates the signals from circuits 122 and 124 to develop the programmed vacuum advance signal. The vacuum advance inhibit circuit 128 operates to cancel the programmed vacuum advance signal whenever the idle stop switch senses that the engine throttle is in the idle position. The TIC function circuit 130 monitors any overtemperature condition of the engine to provide maximum vacuum advance irrespective of the magnitude of the accumulation function.

FIGS. 3A and 3B illustrate a detailed electronic schematic diagram of circuit 102.

ENGINE VACUUM TRANSDUCER CIRCUIT 124

Circuit 124 is disclosed in detail in copending U.S. application Ser. No. 559,203 and the disclosure of that application is incorporated herein by reference. Circuit 124, shown in FIG. 3B, includes a vacuum transducer 132 of the variable inductance type which is operatively coupled with the engine intake manifold to sense manifold vacuum and to modulate the inductance of the transducer in accordance therewith. The transducer 132 has its coil 134 electrically connected in an RL type one-shot circuit including a resistor 136 and a transistor 138. The RL one-shot circuit defined by resistor 136 and transducer 132 is caused to undergo an electrical transient by controlled switching of transistor 138. Transistor 138 is periodically triggered into conduction by means of positive triggering pulses 140 supplied from a pulse generator circuit 142. In response to each triggering pulse, the conduction of transistor 138 permits coil 134 to be charged from the B+ supply through resistor 136 and the collector-emitter circuit of transistor 138. In response to the switching of transistor 138 into conduction, the voltage at the junction of coil 134 and resistor 136 decays along an RL time constant determined by the inductance of transducer 132 and the resistance of resistor 136. A feedback circuit 144 is provided to monitor the voltage at the junction of coil 134 and resistor 136 and is used to maintain transistor 138 in conduction until the magnitude of the voltage transient has decayed to a predetermined magnitude at which time conduction of transistor 138 is terminated. The duration for which transistor 138 conducts varies linearly with the inductance of transducer 132. Because the inductance of transducer 132 is a function of intake manifold vacuum, and specifically an inverse function according to the present embodiment, the duration for which transistor 138 conducts in response to each triggering pulse 140 is in inverse proportion to vacuum. Since the conductivity of the feedback circuit 144 is essentially concurrent with the conductivity of transistor 138, the conductivity of the feedback circuit is monitored by an output stage 146 to develop a pulse output waveform 148. By making the inductance of transducer 132 decrease as the magnitude of vacuum increases, the width of each pulse 148' increases as the magnitude of vacuum increases.

ACCUMULATION FUNCTION CIRCUIT 122

Circuit 122, as shown in FIG. 3A includes a rectangular wave generator circuit 150 which generates a rectangular wave signal 152 appearing at line 154. Rectangular wave generator 150 comprises a voltage type comparator 156, a capacitor 158, and a plurality of five resistors 160, 162, 164, 166 and 168. Resistors 166 and 168 are connected across the B+ supply and form a voltage divider supplying a fraction of the B+ supply voltage to the non-inverting input terminal of comparator 156. The output of comparator 156 is connected to resistor 160 which functions as a pull-up resistor to the positive terminal of the B+ supply. Resistor 162 connects from the comparator output terminal to the inverting input terminal of the comparator while resistor 164 connects from the output terminal to the non-inverting input terminal of the comparator. Capacitor 158 connects between the inverting input terminal of comparator 156 and ground. Rectangular wave generator 150 operates in the following fashion. Assuming that capacitor 158 is uncharged, the signal applied to the non-inverting input of comparator 156 from the voltage dividing resistors 166, 168 establishes a voltage differential between the non-inverting and inverting comparator inputs so that the output of the comparator presents a high impedance to ground. Under this condition, charging current is supplied from the B+ supply through resistors 160 and 162 to charge capacitor 158. As capacitor 158 charges, a point is reached where the voltage differential between the non-inverting and the inverting input terminals reverses polarity to cause the output of comparator 156 to become a low impedance to ground. Capacitor 158 now discharges through resistor 162 and the output terminal of comparator 156 to ground. When capacitor 158 has discharged a certain amount, the voltage differential between the comparator inputs reverses thereby causing the output of the comparator to become a high impedance path to ground. Resistor 164 provides a certain hysteresis beneficial to switching. In this way, the rectangular waveform 152 is developed by circuit 150 during steady state operation. By appropriate selection of circuit component values, the waveform 152 is essentially a square wave. (It will be appreciated that with capacitor 158 uncharged, the first half cycle will be longer than usual.)

A counter 170 composed of two 4-bit up-down counters 172 and 174 is connected to square wave generator 150. The two counters 172 and 174 are cascaded together to form an 8-bit up-down counter; however, as will be explained, only the six most significant bits are utilized in the present embodiment. Thus, while counter 170 has the capability of counting a maximum of 255 pulses of square wave 152 (i.e., $2^8 - 1$), the actual counting is accomplished in units of four pulses each so that counter 170, as used herein, can hold a maximum count of 63, (i.e. $2^6 - 1$). The rectangular wave pulses appearing at line 154 are coupled through the parallel combination of a resistor 176 and a capacitor 178 to the clock inputs 180, 182 of the two counters 172 and 174. The carry-in terminal 184 of counter 172 is grounded while the carry-in terminal 186 of counter 174 is connected to the carry-out terminal 188 of counter 172. The preset enable terminals 190, 192 of the two counters 172, 174 are grounded and the positive power supply terminals 194, 196 and the negative supply terminals 198, 200 for each counter are appropriately connected with the B+ supply. The jam inputs (not shown) are arbitrarily connected to any convenient high or low point; however, it is preferred that they be connected, rather than floating. The reset terminals 202, 204 of the two counters are connected through a reset circuit composed of a resistor 206 and a capacitor 208 to the positive terminal of the B+ supply. The up/down terminals 210, 212 are connected, via input circuitry which is connected with switches 118, 120, to control the accumulator circuitry. An R-2R network composed of 12 resistors 214, 216, 218, 220, 222, 224, 226, 228, 230, 232, 234, and 236 is connected with the six binary outputs 238, 240, 242, 244, 246, 248 (in the order of increasing significance) of counter 170 which are utilized. This R-2R network develops the analog accumulation function signal appearing at line 250. The carry-out terminal 252 of counter 174 is connected through a diode 254 back to the clock inputs 180, 182 of the two counters and a capacitor 256 connects from the carry-out terminal of counter 174 to ground.

Circuit 122 further includes input circuitry which is operatively connected to switches 118, 120. This circuitry includes three resistors 258, 260, 262, a capacitor 264 and a diode 266. Switches 118, 120, which are connected in parallel, are of the grounding type and are adapted to supply a ground on line 268 when either of them is closed. Resistor 258 connects line 268 with the up/down terminals 210, 212 of the counter. Resistor 260 is a pull-up resistor for line 268. With this arrangement of the input circuitry, a ground is applied to line 268 when either switch 118, 120 is closed, and the potential at line 268 is pulled up only when both switches are open. The signal at line 268 is used for two purposes: one, to select the direction in which counter 170 counts; and, two to select one of two frequencies for waveform 152. When the signal at line 268 is pulled up through resistor 260 (i.e. both switches 118, 120 open), counter 170 will count in the up direction, but the signal will have no effect on the frequency of waveform 152. When the signal on line 268 is ground (i.e., either or both switches closed), counter 170 will count in the down direction and the frequency of waveform 152 will be increased. The increase in frequency is caused by the ground signal at line 268 being coupled through resistor 262 and diode 266 to change the fraction of the B+ supply at the non-inverting input of comparator 156. Because of this change, capacitor 158 will charge and discharge over a steeper portion of a negative exponential curve and thereby switch the comparator output at a higher frequency. Thus, from the foregoing, it will be appreciated that counter 170 counts up at a slower rate than the rate at which it counts down.

In operation, counter 170 counts the positive-going leading edges of the positive pulses of waveform 152. The pulses are coupled via resistor 176 and capacitor 178 to both clock inputs 180, 182 of the individual counters 172, 174. Resistor 176 substantially minimizes, or eliminates entirely, any dither while capacitor 178 is basically a speed-up coupling capacitor. Resistor 176 determines logic zero or one during periods capacitor 178 is non-conducting so counter integrity is maintained and also minimizes counter power dissipation. When counter 170 contains a zero decimal count, a ground signal (representing a binary zero) is present at each binary output 238, 240, 242, 244, 246, 248. Assuming that both switches 118, 120 are open, counter 170 will begin to count up, advancing one unit for every four leading edges of waveform 152. Counter 170 counts up in binary fashion with a binary zero at a binary output terminal being represented by a signal level near ground and a binary one being represented by a signal level near B+. The R-2R network which is connected with the six output bits of the counter develops at line 250 an analog signal whose magnitude is representative of the value of the count in counter 170. Thus, the signal at line 250 will be a voltage which becomes progressively more positive as the count advances upwardly, the signal having sixty-three increments. It will also be noted that the rate at which the counter counts up is at a selected counting-up frequency and by way of example this may be 0.5 hertz. When a binary one is present at each of the eight output bits of the two counters, 172, 174 (including the two bits of counter 172 which are not connected), a signal appears at the carry-out terminal 252 of counter 174 which is coupled back via diode 254 to both clock inputs 180, 182 of the two individual counters. This signal latches the counter so that further positive-going transitions in waveform 152 are prevented from advancing the count. (It will be appreciated that in the absence of such a latch circuit, were one more positive-going transition of rectangular wave 152 applied to the counter, the counter output would return to zero.) With the counter latched in this manner the accumulation function is maintained at maximum value. Capacitor 256 is beneficial in attaining best operation of the circuit.

When either switch 118 or switch 120 closes, counter 170 will begin to count down with the count down rate exceeding the count up rate, for example, being at one hertz. When a ground is applied to line 268, the counter is released from its latched condition, and now positive-going transitions in waveform 152 will cause the counter to begin counting down one bit per every four positive-going transitions of waveform 152. In this way, the accumulation function signal will diminish over 63 increments until the count in counter 170 has returned to zero. When the count returns to zero, further positive transitions in waveform 152 have no effect on the counter since the latch circuit works in both directions.

Whenever the power is initially turned on, the counter is reset to zero by the reset circuit including resistor 206 and capacitor 208 which serves to couple a reset pulse to the two individual counters 172, 174, and the rise time for the power supply must be fast enough so that a reset pulse can be coupled to the two individual counters for resetting thereof.

MODULATION CIRCUIT 126

Modulation circuit 126 comprises an input emitter-follower stage which receives the analog accumulation function signal via line 250 and the output signal 148 of engine vacuum transducer circuit 124. This emitter-follower stage comprises an NPN transistor 292 and a plurality of three resistors 294, 296 and 300. Line 250 connects to the base of transistor 292. The collector of transistor 292 connects directly to the positive terminal of the B+ supply and resistors 294, 296 connect in series between the emitter of transistor 292 and ground. Resistor 300 shunts the collector-emitter circuit of transistor 292. Assuming for the moment that transistor 292 is non-conductive, the voltage at line 293 which is at the emitter of transistor 292, will be a selected fraction of the B+ supply as determined by the ratio of the sum of resistors 294 and 296 to the sum of resistors 294, 296 and 300. As the potential at the base of transistor 292 is now progressively made increasingly positive, then the potential at line 293 will follow the potential at the base once the base potential has become large enough to forward bias the base-emitter junction of the transistor. Thus it may be stated that once the magnitude of the accumulation function reaches a certain threshold, the magnitude of the signal at line 293 thereafter also will track magnitudes of the accumulation function which exceed the threshold. The signal at line 295 will track the signal at the emitter of transistor 292 but at a magnitude which is attenuated by the voltage dividing effect of resistors 294, 296.

These two signals, namely the signal at line 293 and the signal at line 295, are used in conjunction with the signal from vacuum transducer circuit 124 to develop the programmed vacuum advance signal. These three signals are supplied as inputs to another stage of circuit 126 which comprises a comparator 302, a plurality of seven resistors, 298, 303, 304, 306, 308, 310, 318 and a plurality of three capacitors 312, 314 and 316. Comparator 302 is a device like comparator 156 and the circuit is converted into an operational amplifier configuration by connecting capacitor 316 from the output terminal of the comparator to ground and connecting resistor 310 as a pull-up resistor for the comparator output to the B+ supply. Line 295 is coupled through resistor 303 to the inverting input of comparator 302 while line 293 is connected through resistor 298 and resistor 304 to the non-inverting input of comparator 302. The collector of the transistor in stage 146 connects to the junction of resistors 298 and 304. Resistor 308 and capacitor 312 connect in parallel from the non-inverting input of the comparator to ground, and resistor 306 and capacitor 314 connect from the output to the inverting input of the comparator. The input circuit associated with the non-inverting input of comparator 302 will tend to create a signal input to the comparator which is representative of the average of pulse waveform 148. Since the average of pulse waveform 148 is a function not only of the pulse width but also the pulse amplitude by virtue of the connection of line 293 through resistor 298, the average of pulse waveform 148 is a function not only of the duration for which transistor stage 146 is non-conductive but also of the value of the accumulation function signal. Thus, the average of signal 148 will increase as the non-conductivity of transistor 146 increases and will also increase as the magnitude of the accumulation function signal increases once the base-emitter of transistor 292 has been forward biased for conduction. Therefore, the average of waveform 148 is equal to the product of the two. As the average of waveform 148 increases, once transistor 292 begins to conduct the programmed vacuum advance signal similarly increases.

The connection of line 295 to the inverting input of comparator 302 causes the programmed vacuum advance signal to be adjusted in proportion to the magnitude of the accumulation function signal. More specifically, there is subtracted from the output of the comparator which would otherwise occur, a signal whose magnitude is proportional to the signal at line 295 which, as will be recalled in an attenuated version of the signal appearing at line 293 from which the pulse waveform 148 is in part developed. The reason for subtracting this signal is that when there is a condition of zero vacuum, the pulse waveform 148 will have a predetermined minimum pulse width for each pulse 148'. In effect then, this subtraction automatically subtracts this minimum initial pulse width of each pulse so that the actual programmed vacuum advance signal will be in proportion to the true magnitude of vacuum signal. In this way the programmed vacuum advance signal is made essentially directly proportional to the magnitude of intake manifold vacuum for a given positive voltage at line 293; also, as explained above the programmed vacuum advance signal is made representative of the voltage at line 293 for any given magnitude of intake manifold vacuum. Thus, with transistor 292 conducting the voltage signal appearing at the output of comparator 302 is representative of the product of the magnitude of engine vacuum and the value of the accumulation function, and the programmed vacuum advance signal is supplied as current flow from circuit 102 through an output resistor 318 into the summing junction.

VACUUM ADVANCE INHIBIT CIRCUIT 128

This circuit is provided to cancel the programmed vacuum advance signal when an engine idle condition exists. Therefore, the circuit is operatively coupled with the idle stop switch 118 by line 268. Circuit 128 is basically a single transistor stage which, when a ground is present at line 268, drives sufficient current into the inverting input of comparator 302 to drive the comparator output voltage to ground. Circuit 128 comprises a PNP transistor 320 and a plurality of four resistors 322, 324, 326 and 328. Resistors 324 and 326 connect in series from line 268 to the base of transistor 320. The emitter of transistor 320 connects directly to the positive terminal of the B+ supply and the collector connects through resistor 328 to the inverting input of comparator 302. Resistor 322 connects between the emitter and base of transistor 320. Whenever the signal at line 268 is pulled up, the transistor 320 is non-conductive and the circuit has essentially no influence on modulation circuit 126. However, when a ground is applied at line 268, then transistor 320 is driven into conduction to cause current to be supplied through the emitter-collector circuit thereof and resistor 328 to the inverting input of comparator 302 and as mentioned this has the effect of driving the comparator such that the programmed vacuum advance signal is reduced to zero magnitude irrespective of the advance otherwise commanded by accumulation function circuit 122 and engine vacuum transducer circuit 124. Whenever the ground is removed from line 268, the programmed vacuum advance signal is again established by accumulation function circuit, and the engine vacuum transducer circuit.

TIC FUNCTION CIRCUIT 130

Circuit 130 is provided for the purpose of protecting the engine from overheating at idle or relative low speed operation on extremely hot days. Basically, the circuit operates to monitor the temperature of engine coolant and, when the coolant temperature rises above a predetermined value, causes vacuum advance to be given in accordance with available engine vacuum alone, the accumulation function circuit being bypassed as it were so that it has no effect on the output of the modulation circuit. In other words, the circuit causes the programmed vacuum advance to be essentially in proportion to available engine vacuum when an excessive coolant temperature is detected.

Circuit 130 comprises an engine coolant temperature responsive switch 330, a transistor 332, a plurality of three resistors 334, 336 and 338 and a pair of diodes 340 and 342. Switch 330 is a normally open, grounding type switch which closes when the temperature of the engine coolant rises above the predetermined value indicative of an incipient overheating condition. Resistors 334 and 336 and switch 330 are connected in series as illustrated across the B+ supply. The junction of resistor 334 and 336 connects to the base of transistor 332. The emitter of transistor 332 connects to the positive terminal of the B+ supply and the collector connects along one current branch through diode 340 and resistor 338 to line 293 and along another branch through diode 342 and resistor 324 to line 268. When switch 330 is open, transistor 332 is non-conductive and circuit 130 has no influence on the other circuits. However, when switch 330 closes, transistor 332 switches into conduction pulling up the potential at its collector. When this happens, the vacuum advance inhibit circuit is prevented from operating as it otherwise would; specifically, it is now impossible for circuit 128 to cancel the vacuum advance when the idle stop switch 118 closes. Circuit 130 also has an effect on modulation circuit 126; specifically circuit 130 drives the input to the non-inverting terminal of comparator 302 sufficiently hard to create the effect on circuit 126 as though the accumulator were at a fairly full level. The level is determined principally by the value of resistor 338. Thus, when TIC function circuit 130 monitors an incipient overheating condition of the engine, full vacuum advance is given until the over-temperature condition is corrected. By giving full vacuum advance when the engine is operating at idle or relative slow speeds, the engine will run at increased rpm. In turn, the usual engine cooling fan will draw more ambient air through the radiator thereby correcting or at least limiting the over-temperature condition.

OPERATION

FIGS. 4 and 5 should be considered together since both relate to the development of the programmed vacuum advance signal. FIG. 4 illustrates a family of graph plots of the magnitude of the programmed vacuum advance signal as a function of time for different magnitudes of engine manifold vacuum. Graph plot 360 illustrates the function for manifold vacuum equal to 13 inches of mercury; graph plot 362, for a vacuum equal to 11 inches of mercury; graph plot 364, for a vacuum equal to 10 inches of mercury; graph plot 366, for a vacuum equal to 8 inches mercury; graph plot 368, for a vacuum equal to 3 inches mercury. The five representative graph plots 360 – 368 are for a condition where accumulation function circuit 122 is counting in the up direction from an initial count of zero to its maximum count. Thus, each of the graph plots 360 – 368 is of a staircase form. It will be observed that all graph plots 360–368 begin at a time equal to 50 seconds after the accumulation function circuit 122 has begun to accumulate counts. The reason for this is that the voltage across the base and emitter terminals of transistor 292 in modulation circuit 126 must overcome the PN junction characteristic before the potential at line 293 can begin to rise, as explained above. Thus, once the base-emitter junction of transistor 292 becomes forward biased, then further increments in the count in accumulation function circuit 122 are directly reflected in the increase in the vacuum advance signal. Thus, each of the staircase graph plots 360 – 368 will contain a number of increments somewhat less than the 63 increments which are provided by accumulation function circuit 122. Because accumulation function circuit 122 counts up at a constant frequency, increments in the graph plots 360 – 368 will always occur at the same point in time independently of the magnitude of engine vacuum. However, the magnitude of each increment will depend upon the magnitude of engine vacuum, the magnitude of the increment increasing as the magnitude of vacuum increases. Thus, the graph plots illustrate that maximum vacuum advance signal is reached earlier in time as the magnitude of manifold vacuum increases above the 10 inches of mercury level. For magnitudes of engine vacuum less than 10 inches of mercury, the vacuum advance signal does not reach its maximum possible limit of +32° after the maximum count in accumulation function circuit 122 has been reached. Thus, the graph plots 366 and 368 do not increase further after the maximum count in accumulation function circuit 122 has been reached (the maximum count being reached after 300 seconds as illustratively shown). It should also be explained that the illustrated graph plots 360–368 are for a condition where the magnitude of resistor 300 is very large, or the resistor is omitted entirely from the circuit. By reducing the resistance of resistor 300, the potential at line 293, for a condition where transistor 292 is not conducting, will increase. This can be used to provide an initial programmed vacuum advance plot, like those shown in FIG. 5, until transistor 292 is forward biased. It should also be appreciated that when accumulation function circuit 122 is counting down, the accumulation function decreases at twice the rate at which it increases because the counting rate at which the accumulation function circuit 122 counts down is doubled.

FIG. 5 illustrates a family of graph plots 370, 372, 374 and 376, using the same information as in FIG. 4. However, each of the plots 370–376 shows the vacuum advance signal as a function of manifold vacuum for a given count contained in accumulation function circuit 122. The graph plot 370, labeled full accumulator, illustrates a condition where the maximum count in accumulation function circuit 122 has forced the emitter voltage of transistor 292 to its maximum; graph plot 372, labeled one-half full, a condition where the count has forced the emitter voltage to one-half maximum; graph plot 374 labeled one-quarter full, a condition where the count has forced the emitter voltage to one-quarter maximum; and graph plot 376, labeled empty, a condition where the emitter voltage is at a minimum.

FIG. 6 illustrates the theory on which modulation circuit 126 operates as described above. For a manifold vacuum of zero inches mercury each pulse in waveform 148 has a certain width $W_o$; this is illustrated by the shaded portion of FIG. 6. As the magnitude of manifold vacuum increases the width of each pulse increases by an amount $\Delta W$ which is directly proportional to the magnitude of manifold vacuum as supplied from engine vacuum transducer circuit 124. Thus, in order to obtain the true magnitude of engine vacuum, for use in modulation circuit 126 to develop the programmed vacuum advance signal, it is necessary to subtract the shaded portion $W_o$ from the width of each pulse so that a measurement of the $\Delta W$ can be obtained. Modulation circuit 126 accomplishes this objective in the manner described above. The amplitude is representative of the count contained in accumulation function circuit 122 and represents the accumulator level. Thus, it is the area of the unshaded portion of the pulse in FIG. 6 which represents the product of the accumulation function and the magnitude of manifold vacuum.

The development of the programmed vacuum advance signal permits the attainment of desired modes of engine operation depending upon the type of driving to which the vehicle is being subjected. For example, the system may be considered as providing one program for city type driving and another program for country type driving. Each of these two programs adapts the engine to a desired mode of operation for each condition. The engine coolant temperature switch 120 prevents the accumulation function circuit 122 from accumulating any count until the engine has warmed up; thus the spark timing is incapable of being advanced by engine manifold vacuum until the engine has warmed up. Once the engine has warmed up, however, the accumulation function circuit is controlled by the idle stop switch. Where the vehicle is being driven under conditions which require frequent operation at idle (for example city driving conditions) the idle stop switch will be frequently closed. Thus, the count in accumulation function circuit 122 would generally fluctuate over a very low range of values; and therefore, the magnitude of the programmed vacuum advance signal will fluctuate over a similar low range of magnitudes even though the actual magnitude of engine vacuum may become rather high at times. In general then, when the vehicle is being operated in a city driving condition the average spark timing advance due to engine manifold vacuum will remain relatively small. This is desirable in reducing the level of exhaust emissions from the vehicle. The vacuum advance inhibit circuit always cancels the programmed vacuum advance signal when the engine idle stop switch closes (except when the TIC function circuit 130 overrides to correct an incipient engine overheat).

When the vehicle is being driven on the highway, the idle stop switch will remain open for extended periods of time thereby permitting maximum count to be accumulated by accumulation function circuit 122. Under this condition the full effect of the engine vacuum signal is obtained. This is advantageous in achieving better fuel economy. Thus, it can be seen that the provision of the programmed vacuum advance signal provides a capability for obtaining both reduced emissions level and at the same time obtaining better fuel economy. In effect, the programmed vacuum advance circuit provides a running average of how the vehicle has been driven (i.e., idle vs. non-idle) for a given time period and weights the available engine vacuum by this average to develop programmed vacuum advance.

Thus, the invention provides a system which achieves substantial improvement and advantages over prior systems. It should be appreciated that the values and examples described in the preferred embodiment represent an illustrative system and are not intended to limit the scope of the invention. It is fully contemplated that different engine designs will require different amounts of advance and different calibration of the individual circuits used in a system embodying the principles of the invention.

The circuits disclosed herein can be constructed from conventional, commercially available circuit components and on the basis of the present disclosure specific values for said components can be selected using well-known design techniques. By way of example, the four bit up-down counters can be Motorola Model No. MC 14516CP and the comparators can be National Semiconductor Model LM 2901. A suitable regulated power supply for supplying the B+ potential to the electronic circuitry is also provided although not shown in detail in the drawings. The regulated power supply may be of any conventional design to provide adequate regulation of the supply voltage eo the electronic circuits, provided that its turn-on rise time be compatible with the reset network for the accumulator. In the present system the regulated power supply is preferably energized from the "on" contact of the conventional ignition switch.

It should be mentioned that the idle stop switch is preferably mounted so as to sense when the throttle has been released by the vehicle operator. Thus it will be appreciated that when the vehicle is running at high speed, and the throttle is suddenly released, the idle stop switch will close sometime before the engine has decelerated to idle speed. Where the engine idle speed is controlled in accordance with the engine temperature, for example by the usual hot/cold idle control arrangement, the mounting of idle stop switch to sense release of the throttle by the operator will insure that switch actuation is independent of the engine idle speed as controlled by the usual hot/cold idle arrangement.

DESCRIPTION OF FIG. 7 EMBODIMENT

FIG. 7 illustrates an electronic schematic diagram of a second embodiment of the present invention. While this embodiment is similar in many respects to the embodiment shown in FIGS. 3A and 3B, there are several important differences. Like components in the two embodiments are identified by like numerals and the similarities between the two embodiments will be readily apparent from comparison of the drawing figures.

One difference between the two embodiments involves the two control switches for the accumulation function circuit (namely, the idle stop switch 118 and the coolant temperature switch 120). Rather than the two switches being connected in parallel with each other as in the first embodiment, the idle stop switch 118 in the second embodiment is connected solely as an input to the vacuum advance inhibit circuit 128, and the coolant temperature switch 120 is connected solely as an input to wave generator circuit 150. The details of each of the two switches per se however remain the same. Briefly, the connection of the coolant temperature switch 120 with wave generator circuit 150 prevents circuit 150 from developing an output waveform until the engine temperature has reached the normal operating level. Therefore, the count in accumulation function circuit 122 remains at zero until the engine has warmed up. By connecting idle stop switch 118 only with vacuum advance inhibit circuit 128, the idle stop switch itself does not directly control the direction in which the accumulator counter counts, but indirectly it does have partial control.

Another difference between the two embodiments is that the direction in which the accumulator counter counts is controlled by the output of modulation circuit 126.

Considering now the construction of the circuit of FIG. 7 in greater detail, there are provided a resistor 400 and a zener diode 402 in association with coolant temperature switch 120 for connection with wave generator circuit 150. Specifically, zener diode 402 and coolant temperature switch 120 connect in series with each other, as illustrated, between the inverting input terminal of comparator 156 and ground. Resistor 400 functions as a pull-up resistor to the positive terminal of the B+ supply for the junction of switch 120 and diode 402. So long as coolant temperature switch 120 remains closed, capacitor 158 cannot be charged and generation of waveform 152 at line 154 is prevented. Thus, there is no input signal to the accumulator counter and the count remains at zero. When switch 120 opens, capacitor 158 can charge and discharge so that circuit 150 develops the output waveform 152. Now, an input signal is supplied to the counter for counting. Unlike the first embodiment, the FIG. 7 circuit can give a fixed advance (by choosing resistor 300) before the engine has warmed up.

Additional circuitry in the form of a comparator 404 and a plurality of four resistors 406, 408, 410 and 412, connected as illustrated, is provided to control the direction in which the accumulator counts. This circuit receives as inputs the output signal of modulation circuit 126, as taken at the output of comparator 302, and the analog accumulation function signal as taken at line 293.

The operation of the embodiment of FIG. 7 is the same as the embodiment of FIGS. 3A and 3B insofar as the magnitude of the programmed vacuum advance signal cannot increase until the engine has warmed up to its normal operating temperature. The embodiment of FIG. 7 also operates like the embodiment of FIGS. 3A and 3B insofar as the counter of the accumulation function circuit will count down whenever the idle stop switch 120 is closed. This is because when the idle stop switch closes, the output at comparator 302 immediately assumes its minimum value. However, the embodiment of FIG. 7 will also cause the accumulation function circuit counter to count down whenever the magnitude of manifold vacuum is less than a selected level, for example 8 inches of mercury. Because the output signal from comparator 302 is representative of the product of engine vacuum and accumulation function (assuming a non-idle condition) and the signal at line 293 is representative of the accumulation function, comparator 404 and associated input resistors operate so that the comparator output is high when engine vacuum is above the selected level and low when engine vacuum is below the selected level.

What is claimed is:

1. An engine control circuit for generating a programmed engine control signal comprising:
   a transducer circuit for providing a transducer signal representative of the instantaneous value of a selected engine operating parameter;
   an up/down counter circuit adapted to selectively add to and subtract from the count contained therein, an input signal applied thereto;
   an input signal generator circuit for generating said input signal and supplying the same to said up/down counter circuit;
   a circuit for modifying said transducer signal by the count in said counter circuit to develop said programmed engine control signal; and
   means operatively associated with the engine and said counter circuit for causing said counter circuit to add said input signal to its count when the engine is operating in one selected operating condition and to subtract said input signal from its count when the engine is operating in another selected operating condition.

2. An engine control circuit as claimed in claim 1 wherein said input signal generator circuit is a pulse generator which generates said input signal as a series of pulses.

3. An engine control circuit as claimed in claim 2 wherein said pulse generator generates said pulses at a given frequency when said counter circuit is counnting up and said pulse generator generates said pulses at a frequency different from said given frequency when said counter circuit is counting down.

4. An engine control circuit as claimed in claim 3 wherein the frequency of the pulses produced by said pulse generator is higher when the counter circuit is counting down than when the counter circuit is counting up.

5. An engine control circuit as claimed in claim 1 including means for limiting maximally and minimally the count of said counter circuit.

6. An engine control circuit as claimed in claim 1 wherein said programmed engine control signal is a programmed spark timing control signal.

7. An engine control circuit as claimed in claim 1 wherein said transducer circuit comprises means for providing said transducer signal in accordance with the instantaneous value of engine manifold vacuum.

8. An engine control circuit as claimed in claim 1 wherein said counter circuit is a digital counter and said input signal generator circuit is a pulse generator which supplies pulses adapted to be counted digitally by said counter circuit.

9. An engine control circuit as claimed in claim 1 wherein said transducer circuit provides said selected engine operating parameter as a pulse type waveform and a component of each of said pulses is subtracted therefrom by said modifying circuit.

10. An engine control circuit as claimed in claim 1 wherein said one and said another selected engine operating conditions are engine idle and non-idle conditions.

11. An engine control circuit as claimed in claim 10 wherein said counter circuit adds said input signal to its count when the engine is operating in the non-idle condition and subtracts said input signal from its count when the engine is operating in the idle condition.

12. An engine control circuit as claimed in claim 1 wherein an idle stop switch is provided for causing said counter circuit to add and subtract said input signal to and from its count.

13. An engine control circuit as claimed in claim 12 including means for cancelling said programmed engine control signal when said idle stop switch is one condition.

14. An engine control circuit as claimed in claim 13 wherein said last-mentioned means cancels said programmed engine control signal when said idle stop switch indicates that the engine is in idle.

15. An engine control circuit as claimed in claim 1 including override means responsive to a given condition for overriding said programmed engine control signal.

16. An engine control circuit as claimed in claim 15 wherein said override means includes a switch responsive to said condition.

17. An engine control circuit as claimed in claim 16 wherein said switch is responsive to engine coolant temperature.

18. An engine control circuit as claimed in claim 1 including means for causing said control circuit to generate a fixed value of said programmed engine control signal until the engine warms up to normal operating temperature.

* * * * *